United States Patent
Deng

(10) Patent No.: US 9,654,005 B2
(45) Date of Patent: May 16, 2017

(54) BATTERY CHARGE AND DISCHARGE MANAGEMENT CIRCUIT AND ELECTRONIC DEVICE THEREOF

(71) Applicant: Silergy Semiconductor Technology (Hangzhou) LTD, Hangzhou, ZheJiang Province (CN)

(72) Inventor: Fuhua Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 99 days.

(21) Appl. No.: 14/829,910

(22) Filed: Aug. 19, 2015

(65) Prior Publication Data

US 2016/0056663 A1 Feb. 25, 2016

(30) Foreign Application Priority Data

Aug. 20, 2014 (CN) .......................... 2014 1 0413716

(51) Int. Cl.
*H02J 7/00* (2006.01)
*H02M 3/158* (2006.01)
*H02J 7/02* (2016.01)

(52) U.S. Cl.
CPC ........... *H02M 3/1582* (2013.01); *H02J 7/022* (2013.01)

(58) Field of Classification Search
CPC .................................................. H02M 3/1582
USPC ....................................................... 320/108
See application file for complete search history.

(56) References Cited

U.S. PATENT DOCUMENTS

| 5,726,551 | A | * | 3/1998 | Miyazaki ............ B60L 11/1803 320/104 |
| 8,450,979 | B2 | | 5/2013 | Kerr et al. |
| 9,130,395 | B2 | * | 9/2015 | Jung ....................... H02J 5/005 |
| 2008/0231233 | A1 | | 9/2008 | Thornton |
| 2014/0152239 | A1 | | 6/2014 | Yao et al. |
| 2014/0203763 | A1 | | 7/2014 | Zhao et al. |

FOREIGN PATENT DOCUMENTS

| CN | 103378616 A | 10/2013 |
| CN | 103825329 A | 5/2014 |
| CN | 103856043 A | 6/2014 |

* cited by examiner

*Primary Examiner* — Suresh Memula
(74) *Attorney, Agent, or Firm* — Michael C. Stephens, Jr.

(57) ABSTRACT

An apparatus can include: (i) a first switch coupled to an external interface and an inductor; (ii) a second switch coupled to ground and a common node between the first switch and the inductor; (ii) a third switch coupled to ground and a common node between the inductor and a fourth switch, where the inductor and first, second, third, and fourth switches form a power converter; (iii) a charge and discharge control circuit coupled to the power converter, and being configured to control the first, second, third, and fourth switches; (iv) an internal load coupled to said fourth switch; and (v) a chargeable battery coupled to the fourth switch, where the battery is configured to provide power to the internal load when the external interface is disconnected from the external power supply and the external load.

15 Claims, 8 Drawing Sheets

US 9,654,005 B2

1

BATTERY CHARGE AND DISCHARGE MANAGEMENT CIRCUIT AND ELECTRONIC DEVICE THEREOF

RELATED APPLICATIONS

This application claims the benefit of Chinese Patent Application No. 201410413716.4, filed on Aug. 20, 2014, which is incorporated herein by reference in its entirety.

FIELD OF THE INVENTION

The present disclosure generally relates to the field of power electronics, and more particularly to a charge and discharge management circuit, along with an associated electronic device.

BACKGROUND

Portable electronic products, such as cellphones and wearable electronic devices are in increasingly wide uses. However, power losses may increase as such portable electronic products have more functionality. Therefore, the service time of portable electronic products may be limited by the battery level, so as to cause adverse effects on user experience. A movable power source is a portable charger with both power supply and charging functions such a movable power source can be used to charge a portable electronic product whenever and wherever possible, or to supply power in a standby state, in order to prolong service time. Movable power source typically include a power supply circuit and an additional battery, such as a lithium battery.

SUMMARY

In one embodiment, an apparatus can include: (i) a first switch coupled to an external interface and an inductor; (ii) a second switch coupled to ground and a common node between the first switch and the inductor; (ii) a third switch coupled to ground and a common node between the inductor and a fourth switch, where the inductor and first, second, third, and fourth switches form a power converter; (iii) a charge and discharge control circuit coupled to the power converter, and being configured to control the first, second, third, and fourth switches; (iv) an internal load coupled to said fourth switch; and (v) a chargeable battery coupled to the fourth switch, where the power converter is configured to provide power from an external power supply to the battery and the internal load when the external interface is coupled to the external power supply, where the battery is configured to provide power to the internal load and via the power converter to an external load when the external interface is coupled to the external load, and where the battery is configured to provide power to the internal load when the external interface is disconnected from the external power supply and the external load.

2

Figure 3:
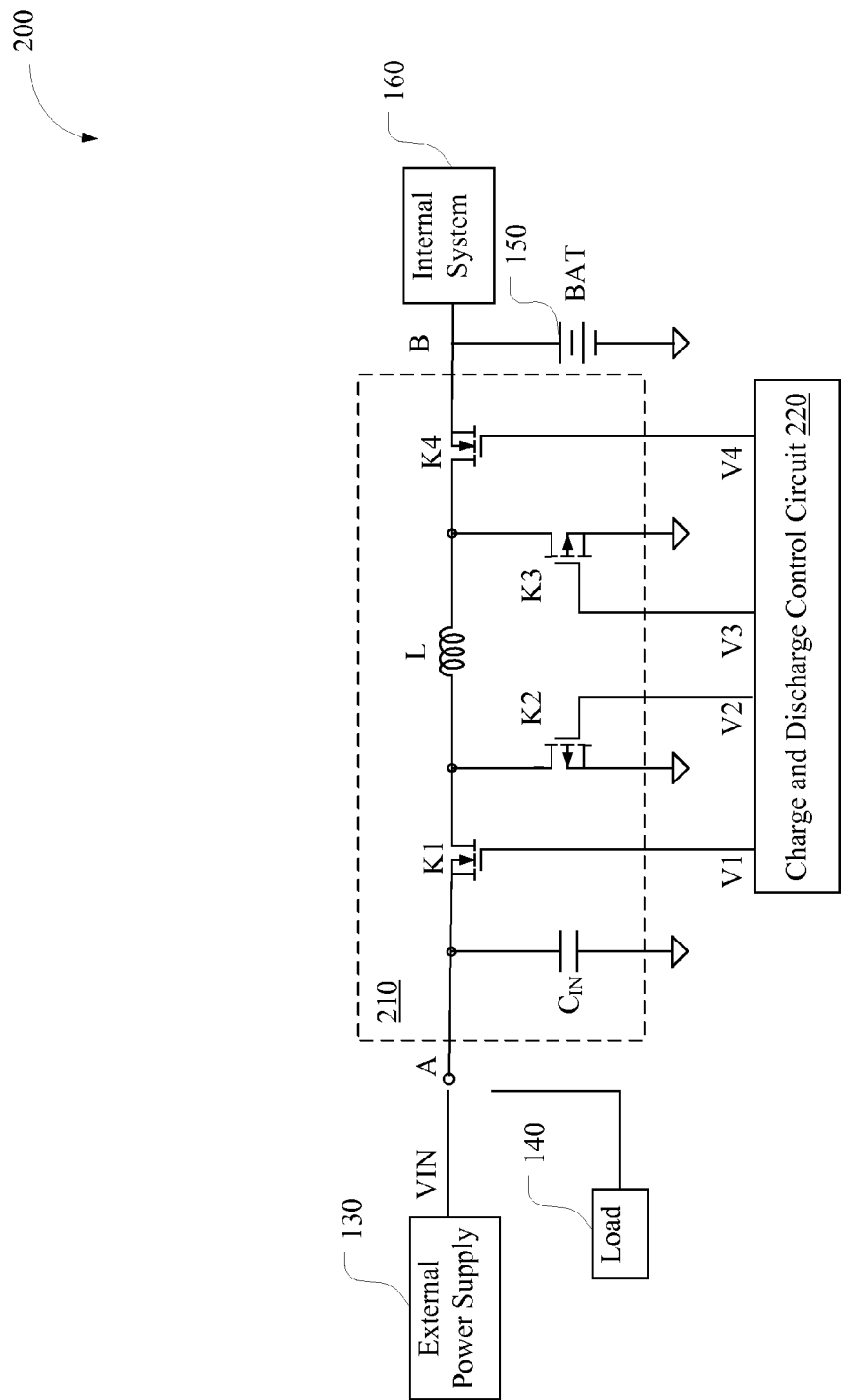

FIG. 3 is a schematic block diagram of a first example charge and discharge management circuit, in accordance with embodiments of the present invention.

Figure 4:
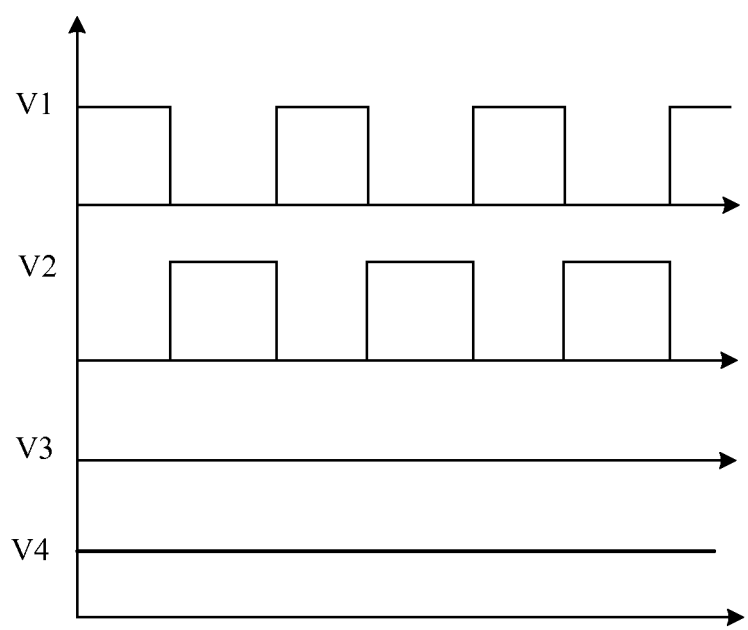

FIG. 4 is a waveform diagram of a first example operation of switch control signals, in accordance embodiments of the present invention.

Figure 5:
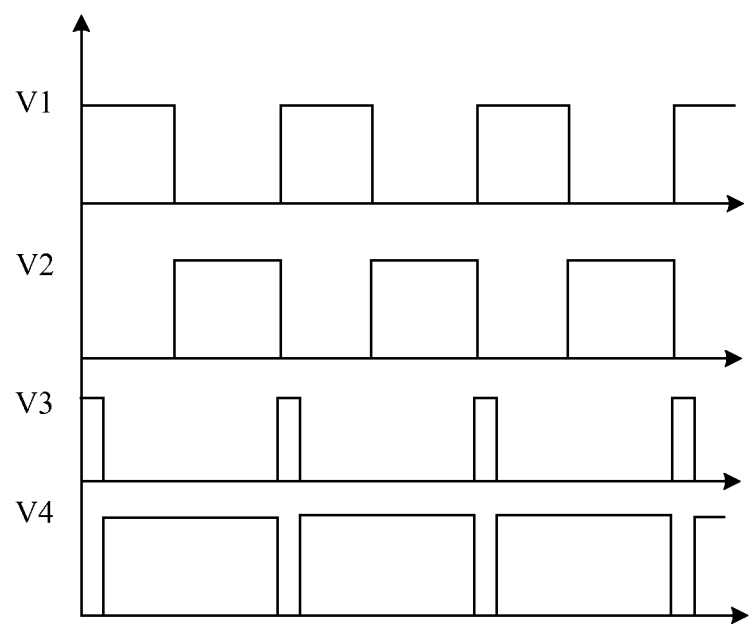

FIG. 5 is a waveform diagram of a second example operation of switch control signals, in accordance embodiments of the present invention.

Figure 6:
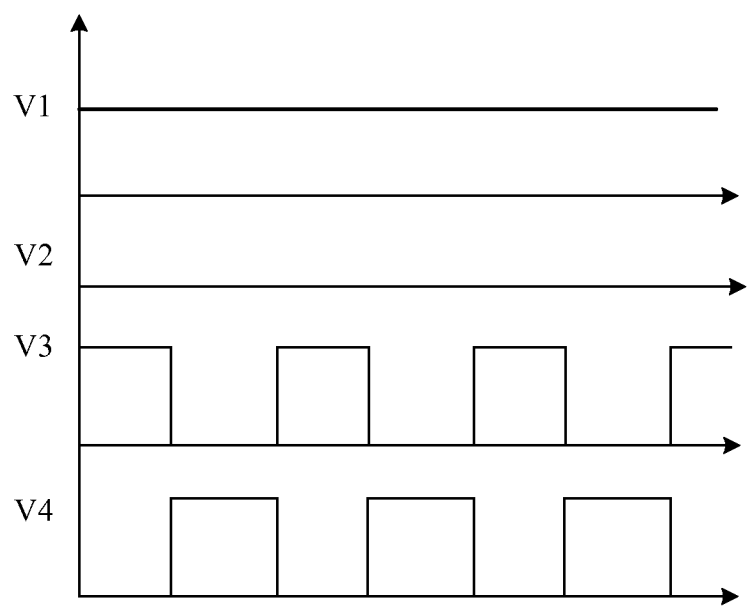

FIG. 6 is a waveform diagram of a third example operation of switch control signals, in accordance embodiments of the present invention.

Figure 7:
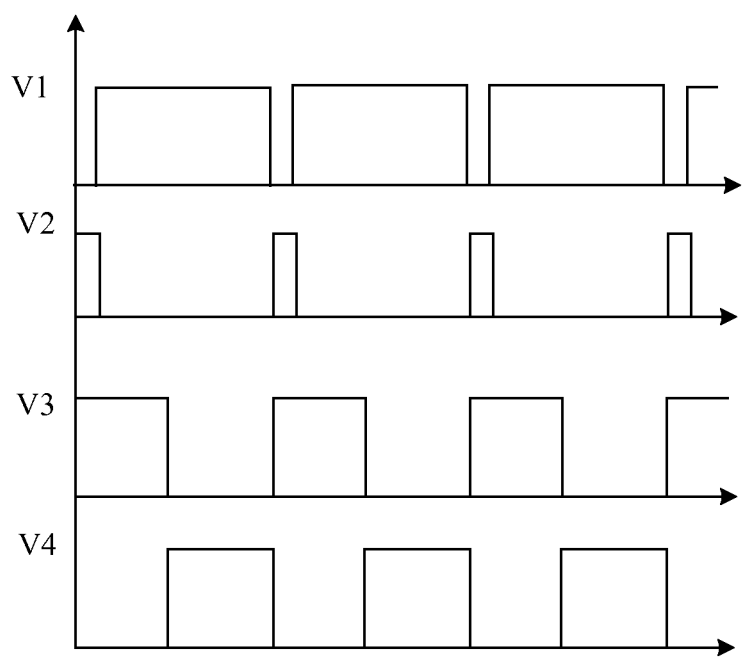

FIG. 7 is a waveform diagram of a fourth example operation of switch control signals, in accordance embodiments of the present invention.

Figure 8:
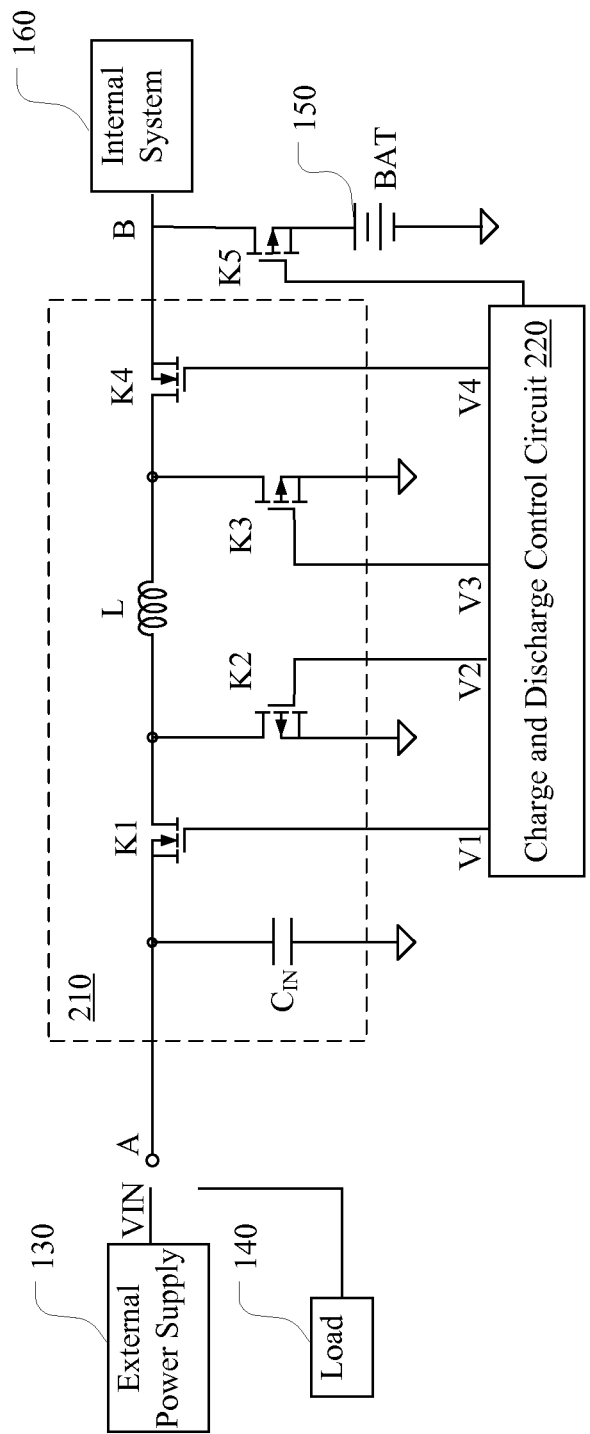

FIG. 8 is a schematic block diagram of a second example charge and discharge management circuit, in accordance with embodiments of the present invention.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In some movable and portable electronic devices that are powered by rechargeable batteries, the battery can be utilised to provide power supply for an internal load such that the internal load may operate normally when there is no externally provided power. The external power supply may be used to re-charge the battery as needed. A battery charge and discharge management system/circuit may thus be important to such movable and portable electronic devices.

Figure 1:
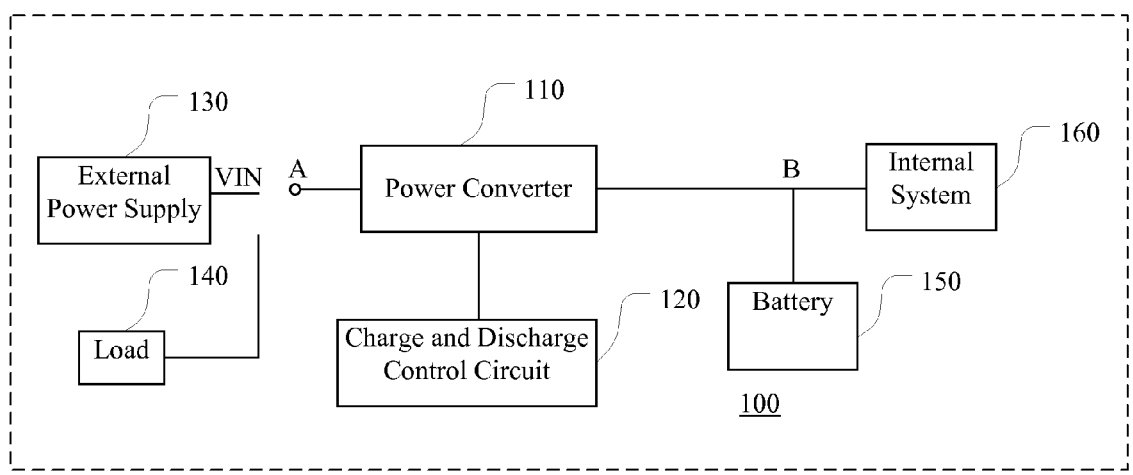
FIG. 1 is a schematic block diagram of an example battery bi-directional charge and discharge system applied in an electronic device.
Figure 2:
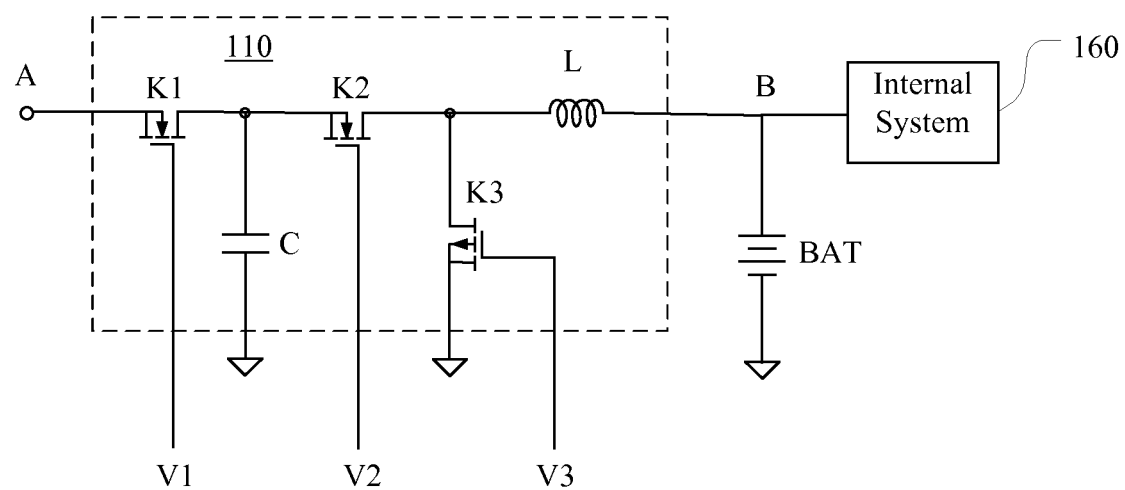
FIG. 2 is a schematic block diagram of an example power converter in an example charge and discharge management circuit.

Referring now to FIGS. 1 and 2, shown are schematic block diagrams of an example battery bi-directional charge and discharge system applied in a chargeable electronic device (100), and an example power converter. Power converter or power converter 110 can include switches K1 and K2, and inductor L, coupled series between external interface A (which can couple with external power supply 130 or external load 140) and battery (BAT) 150 of the portable power source and/or electronic device. Also, switch K3 can connect between ground and a common node of switch K2 and inductor L, and capacitor C can connect between ground and a common node of switches K1 and K2.

When external interface A is coupled with external power supply 130, power converter 110 may operate in a buck mode. In such a case, external interface A can be configured as an input terminal of the power converter, the battery may be configured as an output terminal of power converter 110, and a voltage from the connected power supply can charge the battery by operating the power converter in the buck mode. When external interface A is coupled with external load 140, power converter 110 may operate in a boost mode. In this case, external interface A can be configured as the output terminal of power converter 110, and the terminal of the battery that couples with the power converter may be configured as the input terminal of power converter 110. Here, the battery may charge external load 140 by operating the power converter in the boost mode.

When external interface A is not coupled to the external power supply, such as when the power supply is disconnected or removed, battery 150 may supply power to internal system 160. The internal system can include an internal load, such as an electronic device or circuit. In many cases, a universal serial bus (USB) interface may be used as the charge interface in order to unify the output transmission interface and the charge interface. Thus, external interface A may be configured as a USB interface. If the USB interface is coupled to external load 140, battery 150 can also supply power to the external load via power converter (e.g., power converter) 110. In this case, internal load power supply interface B can be configured as an input terminal of power converter 110, and the USB interface (e.g., interface A) can be configured as the output terminal of power converter 110, and power converter 110 may operate in a boost mode.

Thus, the power converter or charge and discharge circuit can operate in a buck mode when configured to charge battery 150, and in a boost mode when configured to discharge the battery. As such, the battery voltage should be lower than the external power supply (e.g., VIN) during the charging operation and also lower than the external load voltage during the discharging operation. Because of these considerations, there may be circuit limitations once the voltage of the battery and external interface A changes. Moreover, if there are two or more batteries in the movable power source instead of one battery, the voltage range may be relatively large. As a result, it may be difficult to determine the relationship between the input and output voltages of the power converter.

In one embodiment, an apparatus can include: (i) a first switch coupled to an external interface and an inductor; (ii) a second switch coupled to ground and a common node between the first switch and the inductor; (ii) a third switch coupled to ground and a common node between the inductor and a fourth switch, where the inductor and first, second, third, and fourth switches form a power converter; (iii) a charge and discharge control circuit coupled to the power converter, and being configured to control the first, second, third, and fourth switches; (iv) an internal load coupled to said fourth switch; and (v) a chargeable battery coupled to the fourth switch, where the power converter is configured to provide power from an external power supply to the battery and the internal load when the external interface is coupled to the external power supply, where the battery is configured to provide power to the internal load and via the power converter to an external load when the external interface is coupled to the external load, and where the battery is configured to provide power to the internal load when the external interface is disconnected from the external power supply and the external load.

Referring now to FIG. 3, shown is a schematic block diagram of a first example charge and discharge management circuit, in accordance with embodiments of the present invention. In this particular example, charge and discharge management apparatus 200 can include a movable power source with external interface A and a battery (BAT) 150, power converter (charge and discharge circuit) 210, and charge and discharge control circuit 220. Power converter 210 can include switches (e.g., transistors) K1, K2, K3, and K4, and inductor L. Switch K1 can connect between external interface A and inductor L, and inductor L can connect between switches K1 and K4. Switch K4 can also connect to battery 150 and internal load/system 160. Switch K2 can connect between ground and a common node of switch K1 and inductor L. Switch K3 can connect between ground and a common node of inductor L and switch K4. For example, external interface A can be used to couple with external power supply 130 (e.g., for charging battery 150) or external load 140 (e.g., for supplying power from battery 150).

For example, external load 140 can be connected with external interface A to charge a cell phone or wearable electronic product, such as a head-mounted display (HMD). Battery 150 can be any chargeable and dischargeable storage element, such as a lithium battery. Charge and discharge control circuit 220 can be coupled to power converter 210. When external interface A is coupled with external power supply 130, charge and discharge control circuit 220 can generate one or more charge switch control signals in order to control the switching states of switches K1, K2, K3, and K4 in power converter 210 such that power converter 210 provides power to charge battery 150 and to supply internal load 160.

In particular embodiments, when external interface A is coupled with external load 140, charge and discharge control circuit 220 can generate one or more discharge switch control signals in order to control the switching states of switches K1, K2, K3, and K4 in power converter 210 such that power converter 210 provides power to external load 140, and also supplies power to internal load 160. When external interface A is disconnected from both external power supply 130 and external load 140, charge and discharge control circuit 220 can generate one or more discharge switch control signals in order to control the switching states of switches K1, K2, K3, and K4 in power converter 210 such that power converter 210 is substantially disabled, and battery 150 can supply power to internal load 160.

For example, when external interface A is coupled to power supply 130, voltage VIN of external power supply 130 may charge battery 150 and supply power to internal load 160 via power converter 210. In such a case, external interface A can be configured as an input terminal of power converter 210, and terminal B can be configured as an output terminal of power converter 210. When the external interface A is coupled to external load 140, the battery voltage can supply power to external load 140, as well as internal load 160, through charge and discharge circuits/power converter 210. When external interface A is coupled with external power supply 130, and during a time period when a voltage at external interface A is greater than the battery voltage, charge and discharge control circuit 220 can control power converter 210 to operate in a buck mode. When the voltage of external power supply 130 is less than the battery voltage, charge and discharge control circuit 220 can control power converter 210 to operate in a boost mode.

Referring now to FIG. 4, shown is a waveform diagram of a first example operation of switch control signals, in accordance embodiments of the present invention. When the voltage at external interface A is greater than the battery voltage, charge and discharge control circuit 220 can generate control signals V1-V4 to control switch K3 to be off, switch K4 to be on, and switches K1 and K2 to be alternately turned on. For example, switch K2 can be turned on after switch K1 is turned off, and switch K2 may be turned off prior to switch K1 being turned on, or when the inductor current crosses zero. Switches K1-K4 can be implemented as any suitable types of transistors, such as p-type metal oxide semiconductor (PMOS) field effect transistors, or n-type metal oxide semiconductor (NMOS) field effect transistors.

Referring now to FIG. 5 is a waveform diagram of a second example operation of switch control signals, in accordance embodiments of the present invention. If switch K4 is implemented as a PMOS transistor, switch K4 can remain on during the buck charge operation, and switch K3 can remain off. If switch K4 is implemented as an NMOS transistor, in the buck charge operation, switch K4 can remain on when the bootstrap voltage is in a normal range, and switch K3 may be turned by a single pulse (or a plurality of pulses) when the bootstrap voltage is under voltage. In this way, switch K3 can operate in a minimum conduction or on time state, and the bootstrap voltage may be refreshed.

Referring now to FIG. 6, shown is a waveform diagram of a third example operation of switch control signals, in accordance embodiments of the present invention. In this example, when the voltage at external interface A is less than the battery voltage, charge and discharge control circuit 220 can generate control signals V1-V4 to separately control switch K2 to be off switch K1 to be on, and switches K3 and K4 to be alternately turned on. For example, switch K4 can be turned on after switch K3 is turned off, and switch K4 can be turned off prior to switch K3 being turned on, or when the inductor current crosses zero.

Referring now to FIG. 7, shown is a waveform diagram of a fourth example operation of switch control signals, in accordance embodiments of the present invention. If switch K1 is implemented as a PMOS transistor, switch K1 can remain on during the buck charge operation, and switch K2 can remain off. If switch K1 is implemented as an NMOS transistor, in the buck charge operation, switch K1 may remain on when the bootstrap voltage is in a normal range, and switch K2 may be turned on by a single pulse (or a plurality of pulses) when the bootstrap voltage is in an under voltage condition. In this way, switch K2 can operate in a minimum conduction or on time state, and the bootstrap voltage may be refreshed.

In certain embodiments, when external interface A is coupled with external load 140, and during the time period when a voltage at external interface A is greater than the battery voltage, charge and discharge control circuit 220 can control power converter 210 to operate in a boost mode. When the voltage at external interface A is less than the battery voltage, charge and discharge control circuit 220 can control power converter 210 to operate in a buck mode. If switch K4 is implemented as a PMOS transistor, when external interface A is coupled to external load 140, and during the time period when the voltage at external interface A is greater than the battery voltage, charge and discharge control circuit 220 can control switches K1 and K2 to be alternately turned on, switch K3 to be off, and switch K4 to be on, and power converter 210 may operate in the boost mode. If switch K4 is implemented as an NMOS transistor, when external interface A is coupled to external load 140, and during the time period when the voltage at external interface A is greater than the battery voltage, charge and discharge control circuit 220 can control switches K1 and K2 to be alternately turned on. Also, the conduction time of switch K3 can be the minimum conduction time, and the switching state of switch K4 may be opposite to that of switch K3 such that power converter 210 operates in the boost mode.

For example, if switch K1 is implemented as a PMOS transistor, when external interface A is coupled to external load 140, and during the time period when the voltage at the external interface is less than the battery voltage, charge and discharge control circuit 220 can control the conduction time of switch K1 to be a maximum conduction time. Also, the switching state of switch K2 may be opposite to that of switch K1, and switches K3 and K4 may alternately turned on. If switch K1 is implemented as an NMOS transistor, when external interface A is coupled to external load 140, and during the time period when the voltage at the external interface is greater than the battery voltage, charge and discharge control circuit 220 can control switch K1 to remain on, switch K2 to remain off, and switches K3 and K4 to be alternately turned on such that power converter 210 operates in the boost mode.

Thus in particular embodiments, switches K1 and K2 in power converter 210 may form a buck stage, and switches K3 and K4 may form a boost stage. In this way, the power converter may operate in the boost mode or the buck mode when external power supply 130 is charging the battery, and the power supply can charge battery 150 by providing a current thereto through power converter 130 regardless of the relationship between the power supply voltage and the battery voltage. Similarly, when external interface A is coupled to external load 140, switches K1 and K2 in power converter 210 may form a boost stage, and switches K3 and K4 may form a buck stage. Thus, power converter 210 may operate in the boost mode or the buck mode when battery 150 is discharged to external load 140, and the battery can supply power to the external load by providing a current thereto through power converter 210, regardless of the relationship between the battery voltage and the external load voltage.

Referring now to FIG. 8, shown is a schematic block diagram of a second example charge and discharge management circuit, in accordance with embodiments of the present invention. In this particular example, switch K5 can connect between power supply interface B and battery 150. When external interface A is coupled with power supply 130, voltage VIN of external power supply 130 can charge battery 150, as well as supply power to internal load 160 through power converter 210. In such a case, external interface A can be configured as an input terminal of power converter 210, and a common node (B) of battery 150 and internal load 160 may be configured as an output terminal of power converter 200. When external interface A is coupled to external load 140, the battery voltage can supply power to external load 140, as well as to internal load 160 through charge and discharge circuit/power converter 210.

For example, when external interface A is coupled with external power supply 130, during and during the time period when a voltage at external interface A is greater than the battery voltage, charge and discharge control circuit 220 can control power converter 210 to operate in the buck mode. When the voltage of external power supply 130 is less than the battery voltage, charge and discharge control circuit 220 can control power converter 210 to operate in the boost mode. In one case, when the voltage at external interface A is greater than the battery voltage, charge and discharge control circuit 220 can generate control signals V1-V4 to control switch K3 to be off, switch K4 to be on, and switches K1 and K2 to be alternately turned on. For example, switch K2 can be turned on after switch K1 is turned off, and switch K2 can be turned off prior to switch K1 being turned on, or when the inductor current crosses zero. This example case is shown in the waveform diagrams of FIG. 4.

In certain embodiments, if switch K4 is implemented as PMOS transistor, switch K4 can remain on during the buck charge operation, and switch K3 can remain off. If switch K4 is implemented as an NMOS transistor, in the buck charge operation, switch K4 can remain on when the bootstrap voltage is in a normal range. Also, switch K3 may be turned on by a single pulse (or a plurality of pulses) when bootstrap voltage is in an under voltage condition such that switch K3 operates in a minimum conduction time state, and to refresh the bootstrap voltage. This example case is shown in the waveform diagrams of FIG. 5.

Another example case is shown in the waveform diagrams of FIG. 6. When the voltage at external interface A is less than the battery voltage, charge and discharge control circuit 220 can generate control signals V1-V4 in order to control switch K2 to be off, switch K1 to be on, and switches K3 and K4 to be alternately turned on. For example, switch K4 can be turned on after switch K3 is turned off, and switch K4 can be turned off prior to switch K3 being turned on, or when the inductor current crosses zero.

In particular embodiments, if switch K1 is implemented as PMOS transistor, switch K1 can remain on during the buck charge operation, and switch K2 can remain off. If switch K1 is implemented as NMOS transistor, in the buck charge operation, switch K1 can remain on when the bootstrap voltage is in a normal range, and switch K2 may be turned on by a single pulse (or a plurality of pulses) when the bootstrap voltage is in an under voltage condition. In this way, switch K2 can be controlled in the minimum conduction time state, and the bootstrap voltage can be refreshed. This example case is shown in the waveform diagrams of FIG. 7.

For example, when external interface A is coupled with external load 140, and during the time period when a voltage at external interface A is greater than the battery voltage, charge and discharge control circuit 220 can control power converter 210 to operate in a boost mode. When the voltage at external interface A is less than the battery voltage, power converter 220 can control power converter 210 to operate in a buck mode. If switch K4 is implemented as a PMOS transistor, when external interface A is coupled to external load 140, and during the time period when the voltage at the external interface is greater than the battery voltage, charge and discharge control circuit 220 can control switches K1 and K2 to be alternately turned on, switch K3 to be off, and switch K4 to be on, such that the power converter operates in the boost mode. If switch K4 is implemented as an NMOS transistor, when external interface A is coupled to external load 140, and during the time period when the voltage at the external interface is greater than the battery voltage, charge and discharge control circuit 220 can control switches K1 and K2 to be alternately turned on, and the conduction time of switch K3 to be the minimum conduction time. Also, the switching state of switch K4 can be opposite to that of switch K3 such that power converter 210 may operate in the boost mode.

In particular embodiments, if switch K1 is implemented as a PMOS transistor, when external interface A is coupled to external load 140, and during the time period when the voltage at the external interface is less than the battery voltage, charge and discharge control circuit 220 can control the conduction time of switch K1 to be the maximum conduction time. Also, the switching state of switch K2 can be opposite to that of switch K1, and switches K3 and K4 may alternately turned on. If switch K1 is implemented as an NMOS transistor, when external interface A is coupled to the external load, and during the time period when the voltage at the external interface is greater than the battery voltage, charge and discharge control circuit 220 can control switch K1 to remain on, switch K2 to remain off, and switches K3 and K4 to be alternately turned on such that power converter 210 operates in the boost mode.

In particular embodiments, when external interface A is coupled with external power supply 130 and the external power supply voltage is in a normal input range, and during the time period when the battery voltage is greater than a minimum voltage required by internal load 160, switch K5 can remain on to charge battery 150. Also, during the time period when the battery voltage is less than the minimum voltage as may be required by internal load 160, switch K5 may not be fully conducting so as to linearly charge battery 150. When external interface A is disconnected from external power supply 130, switch K5 can remain on, and battery 150 can charge internal load 160 and/or external load 140 through switch K5.

In certain embodiments, when external interface A is coupled with external power supply 130 and the power supply voltage is in the normal input range, and if the battery voltage is greater than a minimum voltage required by internal load 160, charge and discharge control circuit 220 can control switch K5 to remain on during the charge operation. In this way, power converter 210 may charge battery 150 through switch K5, as in a standard charge mode, as described above. In the charge operation, if the battery voltage is less than the minimum voltage as may be required by internal load 160, switch K5 may not be fully conducting in order to linearly charge battery.

For example, switches K1 and K2 in power converter 210 can form a buck stage, and switches K3 and K4 may form a boost stage. Thus, power converter 210 may operate in a boost mode or a buck mode when the external power supply is charging the battery. Also, the power supply can charge the battery by generating a current thereto through power converter 210, regardless of the relationship between the power supply voltage and the battery voltage. Further, when external interface A is coupled to external load 140, switches K1 and K2 in power converter 210 can form a boost stage, and switches K3 and K4 may form a buck stage.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
   a) a first switch coupled to an external interface and an inductor;
   b) a second switch coupled to ground and a common node between said first switch and said inductor;
   c) a third switch coupled to ground and a common node between said inductor and a fourth switch, wherein said inductor and first, second, third, and fourth switches form a power converter;
   d) a charge and discharge control circuit coupled to said power converter, and being configured to control said first, second, third, and fourth switches;
   e) an internal load coupled to said fourth switch; and
   f) a chargeable battery coupled to said fourth switch, wherein said power converter is configured to provide power from an external power supply to said battery and said internal load when said external interface is coupled to said external power supply, wherein said battery is configured to provide power to said internal load and via said power converter to an external load when said external interface is coupled to said external load, and wherein said battery is configured to provide power to said internal load when said external interface is disconnected from said external power supply and said external load.

2. The apparatus of claim 1, wherein when said external interface is coupled to said external power supply:
a) when a voltage at said external interface is greater than a battery voltage, said charge and discharge control circuit is configured to control said power converter to operate in a buck mode; and
b) when said voltage of said external power supply is less than said battery voltage, said power converter is configured to control said power converter to operate in a boost mode.

3. The apparatus of claim 1, wherein when said external interface is coupled with said external load:
a) when a voltage at said external interface is greater than a battery voltage, said charge and discharge control circuit is configured to control said power converter to operate in a boost mode; and
b) when said voltage at said external interface is less than said battery voltage, said charge and discharge control circuit is configured to control said power converter to operate in a buck mode.

4. The apparatus of claim 2, wherein:
a) said fourth switch comprises a PMOS transistor; and
b) when said external interface is coupled to said external power supply and said voltage at said external interface is greater than said battery voltage, said charge and discharge control circuit is configured to control said first and second switches to be alternately turned on, said third switch to be off, and said fourth switch to be on such that said power converter operates in said buck mode.

5. The apparatus of claim 2, wherein:
a) said fourth switch comprises an NMOS transistor; and
b) when said external interface is coupled to said external power supply and said voltage at said external interface is greater than said battery voltage, said charge and discharge control circuit is configured to control said first and second switches to be alternately turned on, to control a conduction time of said third switch to be a minimum conduction time, and switching state of said fourth switch to be opposite to that of said third switch such that said power converter operates in said buck mode.

6. The apparatus of claim 2, wherein:
a) said first switch comprises a PMOS transistor; and
b) when said external interface is coupled to said external power supply and said voltage at said external interface is greater than said battery voltage, said charge and discharge control circuit is configured to control said first switch to be alternately turned on, said second switch to be off, and said fourth switch to be on such that said power converter operates in said buck mode.

7. The apparatus of claim 2, wherein:
a) said first switch comprises an NMOS transistor; and
b) when said external interface is coupled to said external power supply and said voltage at said external interface is less than said battery voltage, said charge and discharge control circuit is configured to control said conduction time of said first switch to be a maximum conduction time, a switching state of said second switch to be opposite to that of said first switch, and said third and fourth switches to be alternately turned on such that said power converter operates in said boost mode.

8. The apparatus of claim 3, wherein:
a) said fourth switch comprises a PMOS transistor; and
b) when said external interface is coupled to said load and when said voltage at said external interface is greater than said battery voltage, said charge and discharge control circuit is configured to control said first and second switches to be alternately turned on, said third switch to be off, and said fourth switch to be on such that said power converter operates in said buck mode.

9. The apparatus of claim 3, wherein:
a) said fourth switch comprises an NMOS transistor; and
b) when said external interface is coupled to said load and said voltage at said external interface is greater than said battery voltage, said charge and discharge control circuit is configured to control said first and second switches to be alternately turned on, said third switch to have a conduction time that is a minimum conduction time, and said fourth switch to have a switching state that is opposite to that of said third switch such that said power converter operates in said buck mode.

10. The apparatus of claim 3, wherein:
a) said first switch comprises a PMOS transistor; and
b) when said external interface is coupled to said load and said voltage at said external interface is less than said battery voltage, said charge and discharge control circuit is configured to control said conduction time of said first switch to be said maximum conduction time, a switching state of said second switch to be opposite to that of said first switch, and said third and fourth switches to be alternately turned on such that said power converter operates in said buck mode.

11. The apparatus of claim 3, wherein:
a) said first switch comprises an NMOS transistor; and
b) when said external interface is coupled to said load and said voltage at said external interface is greater than said battery voltage, said charge and discharge control circuit is configured to control said first switch to be alternately turned on, said second switch to be off, and said fourth switch to be on such that said power converter operates in said boost mode.

12. The apparatus of claim 1, further comprising a fifth switch coupled to said battery, said fourth switch, and said internal load.

13. The apparatus of claim 12, wherein when said external interface is coupled to said external power supply and said power supply voltage is in a normal input range:
a) when said battery voltage is greater than a minimum voltage for said internal load, said fifth switch is configured to be on to charge said battery; and
b) when said battery voltage is less than said minimum voltage for said internal load, said fifth switch is configured to linearly charge said battery.

14. The apparatus of claim 12, wherein when external power supply is disconnected from said external interface, said fifth switch is configured to be on to allow said battery to supply power to said internal load.

15. The apparatus of claim 12, wherein when said external power supply is disconnected from said external interface, said fifth switch is configured to be on to allow said battery to supply power to said external load through said power converter.

* * * * *